United States Patent
Seigel et al.

(10) Patent No.: US 7,206,757 B2
(45) Date of Patent: Apr. 17, 2007

(54) SYSTEM FOR PURCHASING GEOGRAPHICALLY DISTINCTIVE ITEMS VIA A COMMUNICATIONS NETWORK

(76) Inventors: Ronald E. Seigel, 2050 North Ave., Napa, CA (US) 94558; Alexandra N. Seigel, 2050 North Ave., Napa, CA (US) 94558; John Ullmen, 1411 1/2 Barry Ave., Los Angeles, CA (US) 90025

( * ) Notice: Subject to any disclaimer, the term of this patent is extended or adjusted under 35 U.S.C. 154(b) by 1092 days.

(21) Appl. No.: 10/120,643

(22) Filed: Apr. 11, 2002

(65) Prior Publication Data
US 2003/0050815 A1 Mar. 13, 2003

Related U.S. Application Data

(63) Continuation-in-part of application No. 09/825,637, filed on Apr. 3, 2001.

(51) Int. Cl.
*G06Q 30/00* (2006.01)
(52) U.S. Cl. .................................................. 705/26
(58) Field of Classification Search .................. 705/26
See application file for complete search history.

(56) References Cited

U.S. PATENT DOCUMENTS

| | | | | |
|---|---|---|---|---|
| 6,324,521 B1 * | 11/2001 | Shiota et al. | ............... | 705/27 |
| 6,460,020 B1 * | 10/2002 | Pool et al. | ............... | 705/26 |
| 6,609,107 B1 * | 8/2003 | Shim | ............... | 705/26 |
| 2001/0037250 A1 * | 11/2001 | Lefkowitz | ............... | 705/26 |
| 2003/0023456 A1 * | 1/2003 | Dilollo et al. | ............... | 705/1 |
| 2003/0191652 A1 * | 10/2003 | Li et al. | ............... | 705/1 |

FOREIGN PATENT DOCUMENTS

GB 2223116 A * 3/1990

OTHER PUBLICATIONS

Businessline, India: Bye, bye Burma Bazaar!, Chennai Apr. 4, 2001.*

* cited by examiner

*Primary Examiner*—Mark Fadok
(74) *Attorney, Agent, or Firm*—Lathrop & Gage LC

(57) ABSTRACT

A system for purchasing geographically distinctive items comprising an Internet accessible database and a plurality of sub-databases. A buyer's terminal is coupled to a system server via a communications network, which also provides communication between the system server and vendors, manufacturers or importers. Each sub-database includes content elements for gift items and related information organized in accordance with both a 'source' geographic location and a 'destination' geographic location. There is a separate Source/Destination sub-database for each corresponding pair of Source and Destination Geographic Shopping Coordinates. After a buyer initiates a Geographic Shopping session, the system determines the buyer's Geographic Shopping Coordinates. The system then locates and displays content from the corresponding Source/Destination sub-database. If the buyer proceeds to make a purchase, the system sends the orders to the appropriate vendors, importers and manufacturers assigned to the shipping locality of the Destination Coordinate.

25 Claims, 10 Drawing Sheets

SYSTEM FOR PURCHASING GEOGRAPHICALLY DISTINCTIVE ITEMS VIA A COMMUNICATIONS NETWORK

CROSS-REFERENCE TO RELATED APPLICATIONS

This application is a continuation-in-part of U.S. application Ser. No. 09/825,637, filed Apr. 3, 2001, entitled A SYSTEM AND METHOD FOR PERSONALIZING, CUSTOMIZING AND DISTRIBUTING GEOGRAPHICALLY DISTINCTIVE PRODUCTS AND TRAVEL INFORMATION OVER THE INTERNET, the entire contents of which are incorporated herein by reference.

FIELD OF THE INVENTION

The present invention relates to the purchasing of items, and more specifically, to a system for the purchase of geographically distinctive items including gifts, products, services, souvenirs, and postcards via a communications network.

PROBLEM

The majority of the Internet population uses the Internet for travel research and booking trips. The Internet has proven to be cost effective to the travel industry as a communication channel for distributing travel information and conducting travel commerce. The present invention addresses the problem of enabling vendors, importers and manufacturers of geographically distinctive products and services to reach and conduct transactions with their target demographic market: time-starved frequent travelers who, during and after their trips, seek items that are associated with a particular country, city or region. This problem can most effectively be solved through the use of the Internet.

Heretofore, buyers have typically ordered gifts either via mail, telephone or over the Internet through a catalog, either in print or on-line, in which a single vendor's merchandise is offered. In some instances, a buyer has had the opportunity to select gift items from several sources in a given catalog. However, nearly all items in all of these previously existing catalogs are categorized with respect to product type or with respect to occasions, as opposed to geographic association, which is very important to frequent travelers.

Furthermore, none of the items in the previous catalogs are organized with any regard to the buyer's or the recipient's shipping location or to the importer or manufacturer best suited to fulfill the order in that locality. None of them completely eliminate the customs process itself from the transaction including sorting, weighing, inspecting, classifying and repacking, all of which cause inconvenient delays in international shipments. Often times travel gifts arrive weeks after the traveler returns home. None of the previous catalogues are organized to overcome interstate commerce restrictions on certain items in the United States such as the shipment of California wines to gift recipients in the state of Texas.

During their trips, frequent travelers are usually pressed for time. However, they still want to show they care by shopping for "last minute" postcards and gifts. In this specific buying context frequent travelers have two imperatives: (1) products and services must be geographically distinctive, (2) the shopping session must be streamlined and, above all, convenient. Unfortunately, these good gift-giving intentions are often abandoned in order to avoid the stress of filling out tax forms, custom lines, language barriers, and currency conversion. Ironically, travelers on the go also have time to kill as a captive audience on a cruise ship, a train, an airplane, or while waiting in the airport for a delayed flight or a security check. Under these circumstances, gift selection in stores can be limited or devoid of personal relevance to the recipient. The idea of carrying merchandise home often aborts the gift-giving mission, altogether. Thus, frequent travelers, when on a trip, face significant problems in finding and delivering geographically distinctive gifts without significant inconvenience. Moreover, frequent travelers face the same problems before and after their trips, if they desire to buy a geographically distinctive gift on impulse, perhaps inspired by their travel research.

Likewise, from the perspective of vendors, importers and manufacturers, it is difficult to advertise and market geographically distinctive items to a sophisticated worldwide audience that is literally a moving target, i.e., frequent travelers while they are on their trips. Effectively targeting impulse buying frequent travelers at home is also difficult because it is hard to predict when such impulses will occur, given that geographic distinctiveness, as the buying criteria, is less of an imperative in between trips. It is also difficult to predict which types of gifts the buyer desires at a given point in time and to provide an immediate means for allowing the buyer to act on the impulse. Thus, for vendors, importers and manufacturers advertising to frequent travelers, as a demographic group, either while on their trips, or in the moment of impulse buying in between trips, the cost of acquiring the right customers for their geographically distinctive goods and services can be prohibitive using currently available media options. With traditional advertising methods, the cost of acquiring a new customer can be several times the amount of an average order.

SOLUTION

The present invention solves the above problems through a Geographic Shopping System comprising an Internet accessible Geographic Shopping Database, a plurality of sub-databases and methods of employing them. A buyer's terminal is coupled to a system server via a communications network, which also provides communication between the system server and vendors, manufacturers or importers, as well as a recipient. In a personal Geographic Shopping session the buyer can also be the gift recipient. The system server is also coupled to a system processor that accesses and processes data stored in the databases. A buyer's terminal may be any Internet access or telecommunication device such as a personal computer, laptop, kiosk, personal digital assistant, telephone, cellular telephone or an Interactive TV.

Each sub-database includes content elements for gift items and related information organized in accordance with both (1) a 'Source' geographic location which is the country city or region most associated with the item; and (2) a 'Destination' geographic location which is the country, city or region of the recipient's shipping locality. There is a separate Source/Destination sub-database for each corresponding pair of Source and Destination Geographic Shopping Coordinates. Once the buyer initiates a Geographic Shopping session, the system determines the buyer's Geographic Shopping Coordinates, either by the manual request of the buyer or through other methods. The system then locates and displays content from the corresponding Source/Destination sub-database, optionally in a format that is most suitable for the buyer's terminal. If the buyer proceeds to make a purchase, the system sends the orders to the appropriate vendors, importers and/or manufacturers assigned to the shipping locality of the Destination Coordinate.

This method of database organization, based on the pairing of Source and Destination Geographic Shopping Coordinates, enables the prompt selection and presentation of only those geographically distinctive items associated with one location that can be sent to the recipient's shipping locality without interstate commerce restrictions and without involving customs processes. The elimination of these restrictions are possible because the vendor, importer or manufacturer assigned to each content element, in each separate sub-database, has either already imported the item to the designated shipping locality or has the capability of manufacturing it and fulfilling the order within that locality, i.e., within the selected Destination Geographic Shopping Coordinate. The same item, e.g., Swiss watch, may have as many different importers fulfilling the orders as there are Destination Geographic Shopping Coordinates in the system. If there is not an importer for the Swiss watch in a particular destination (shipping locality) represented by a Destination Geographic Shopping Coordinate, this item would not be contained in that Source/Destination sub-database and thus, would not be displayed to the buyer.

Buyers are given the option of various travel commerce categories such as products, services, postcards and customized souvenirs each of which has individual content elements in the Source/Destination sub-databases. Product and service recommendations and gift suggestions may be displayed in the form of direct response ads linked to corresponding content elements in the same Source/Destination sub-database. Postcards can be sent to recipients that are linked to a Source/Destination sub-database so that recipients can "go shopping" in the country, city or region associated with the postcard subject matter. Buyers can also customize geographically distinctive souvenirs, the orders for which are sent to manufacturers in the buyer's or recipient's shipping locality.

Geographic Shopping sessions can be optionally initiated from outside of the system. For example, digital content providers, advertisers and/or affiliates are supplied with lists of URLs that can link their geographically relevant text, video or images to a Source (Geographic Shopping Coordinate) Webpage in the system, the one that is most associated with the geographic location of their content. Source Webpages, contained in a Source Webpage Database in the system, prompt the buyer to select a Destination Geographic Shopping Coordinate so that the system can locate and display content elements from the corresponding Source/Destination sub-database. Icons embedded, for example, in digital 'vacation' photo album software or superimposed on geographically relevant Interactive TV content can also be linked to Source Webpages in the system. Frequent Travelers are solicited to initiate a Geographic Shopping session by selecting hyperlinked content or icons found outside of the system, and then are prompted to purchase geographically distinctive products and services, on impulse, from within the system.

As an additional option, vendors, importers and manufacturers can reach and conduct direct response transactions with frequent travelers virtually anywhere and at any time, while they are shopping for 'last minute' gifts on a trip, or while they are at home in between trips, whenever the need for geographic distinctiveness drives the impulse buying session. Further, by enabling convenient purchases in both gift-buying contexts, the system provides a method for vendors, importers and manufacturers to promptly capture orders and thus acquire highly desirable customers, for a fraction of the cost of conventional advertising, on or off the Internet.

DETAILED DESCRIPTION

Geographic Shopping System

Figure 1:
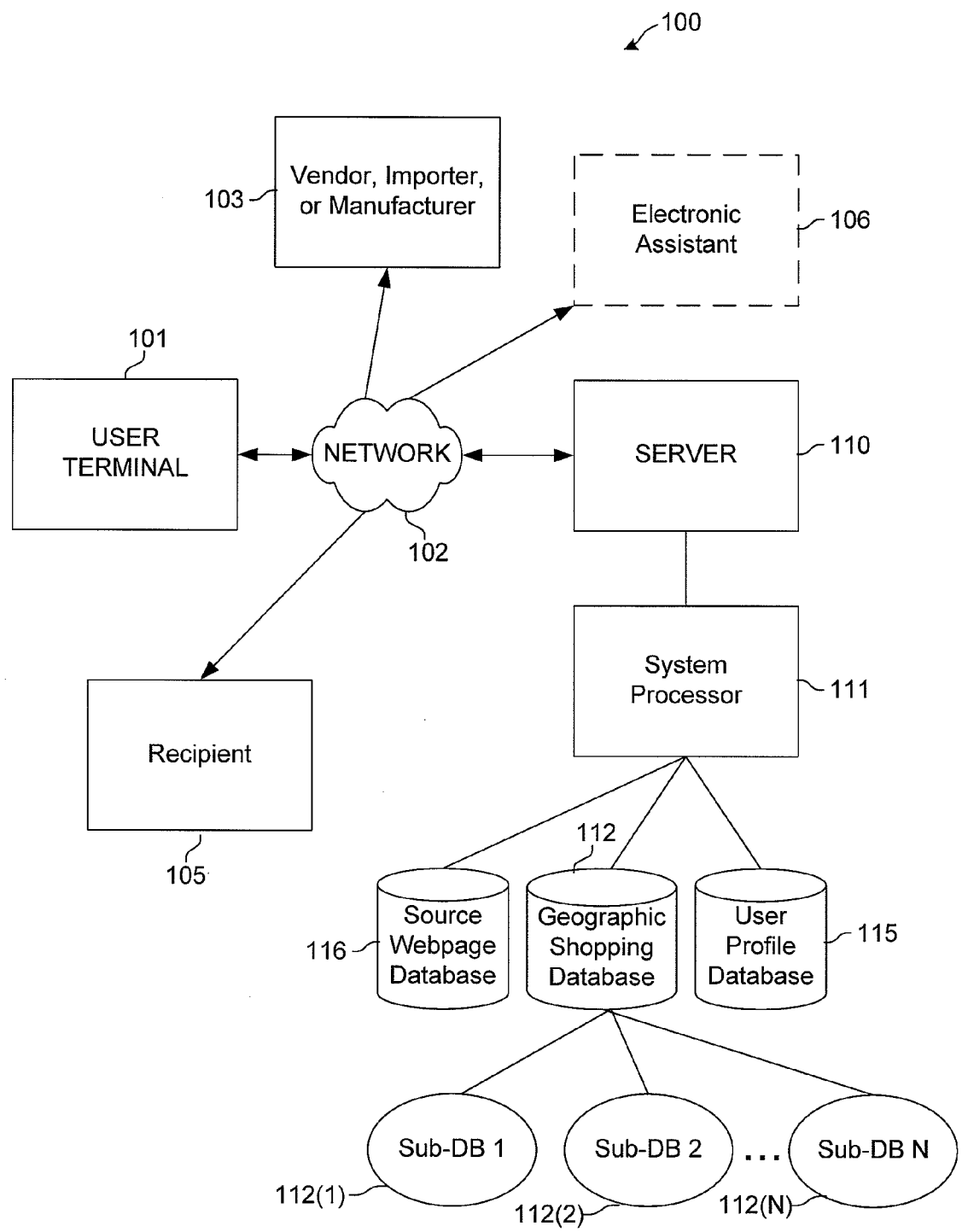
FIG. 1 is a diagram of an exemplary embodiment of the present Geographic Shopping System, showing high-level system components.

FIG. 1 is a diagram of an exemplary embodiment of the present Geographic Shopping System 100 (hereinafter referred to as "the system"), showing high-level system components. As shown in FIG. 1, server 110 is coupled to a user (also referred to as a buyer) terminal 101 via a communications network 102. Network 102 also provides communications between server 110 and a vendor, importer or manufacturer 103, as well as a recipient 105. In a personal Geographic Shopping session the buyer is also the gift recipient. Server 110 is coupled to a system processor 111 that accesses and processes data stored on a Geographic Shopping Database 112, a User Profile Database 115, and a Source Webpage Database 116. Geographic Shopping Database 112 contains a plurality of sub-data bases 112(*), where the "*" character is a 'wild card' indicating any one of the plurality of sub-databases 112(1)–112(n). Electronic Assistant 106 is an optional electronic customer service agent hosted on a remote system, i.e., on a system that is not necessarily part of system 100.

The Geographic Shopping Database 112 comprises a plurality of Source/Destination sub-databases 112(*). Each sub-database includes data records containing travel commerce content elements having associated therewith "Source" and "Destination" Geographic Shopping Coordinates corresponding to the Source/Destination sub-database 112(*) in which the content elements are located. Source and Destination Geographic Shopping Coordinates are indicia, that when paired, uniquely identify a Source/Destination sub-database 112(*). Content elements are representations of specific travel commerce items, e.g., products, services, postcards, customized souvenirs or direct response Geographic Shopping advertisements, hereinafter referred to as direct response 'GeoShopping' ads (described below) that can be displayed or presented on a user terminal 101 in the form of text, images and/or sound.

In an alternative embodiment, each of the Source/Destination sub-databases 112(*) can be sorted 'on the fly', i.e., the appropriate Source/Destination sub-database 112(*) can be created only when required, by sorting a master database (e.g., database 112) containing content elements for all sources and destinations. In this embodiment, the master database may be organized and/or indexed such that each content element in the database has associated therewith a list or indicia of applicable Source and Destination Geographic Shopping Coordinates.

The Source Geographic Shopping Coordinate represents the country, city or region associated with the content element. For example black coral jewelry may be associated with Hawaii, a type of pink coral jewelry may be associated with Italy. A Swiss product may be manufactured in several countries, but it may be only associated with Switzerland (Source Coordinate) in the mind of the consumer, which gives the product geographical distinctiveness, even if it is sold locally all over the world. The default Source Geographic Shopping Coordinate is the country, city or region in which the buyer is physically located at the point of purchase.

The Destination Geographic Shopping Coordinate represents the country, city or region to which the product will be shipped or at which the service will be received, e.g., a user's or recipient's physical address. The Destination Geographic Shopping Coordinate is also referred to as the recipient's shipping locality. A vendor 103 (hereinafter including vendor, manufacturer and importer), to whom the order is routed, is assigned to each individual content element based on the Destination Geographic Shopping Coordinate, taking into consideration duty, customs processes, interstate commerce regulations, and other geographically related restrictions. A plurality of content elements are created for the same product or service, one content element for each Destination Coorinate, i.e., each shipping locality to which the item can be sent, provided a vendor for that item has been assigned to the Destination Coordinate.

Content elements may be categorized into travel commerce categories including travel commerce content items such as products, services, postcards, customized souvenirs and direct response GeoShopping ads. An example of content elements in a Source/Destination sub-database 112(*) is a plurality of travel commerce content items (e.g., gifts, souvenirs, postcards, etc.) from or associated with France (Source Coordinate) that can be sent to Japan (Destination Coordinate). A complete set of Source/Destination ('S/D') sub-databases for France includes one sub-database for each Destination country, city or region. The entire Geographic Shopping Database 112, therefore, includes as many S/D sub-databases as there are combinations of Source and Destination Geographic Shopping Coordinates. The determination of both Source and Destination Geographic Shopping Coordinates enables the present system to locate the corresponding S/D sub-database and display its content, thereby establishing the Geographic Context for the buyer's Geographic Shopping session.

The Geographic Context can be repeatedly changed in the same Geographic Shopping Session which quickly matches a buyer, accessing the system 100 from a remote terminal 101, with importers or local manufacturers of geographically distinctive items throughout the world 103, at the point of purchase. As the buyer changes the Source and Destination Coordinates the system 100 displays content from the corresponding S/D sub-database 112(*). For example, at a airport kiosk (terminal 101) in Rome, with the default Source Coordinate set for Italy and the Destination Coordinate set manually for the buyer's home town, products associated with Italy that can be sent home restriction-free are automatically displayed first. If the buyer manually changes the Source Coordinate to France and the Destination Coordinate to the shipping locality of a recipient 105 in Australia, the Geographic Context for the shopping session is changed correspondingly.

The optional User Profile Database 115 includes Personal Profiles and, optionally, Recipient Profiles and Group Profiles (See Table 1 and accompanying description, below). These three types of User Profiles may be employed to personalize a Geographic Shopping Session. In a personalized Geographic Shopping Session, the System Processor 111 matches attributes and preferences from User Profiles found in the User Profile Database with 'Non-locational' Attributes from travel commerce content elements (See Table 2 and accompanying description, below) found in the Source/Destination sub-databases 112(*). Non-locational attributes are those characteristics or aspects of a content element that are not necessarily related to a geographic location.

Employing User Profiles to filter the sub-databases limits the display of content to a filtered set of products and services. The limited display includes those products and services associated with a pre-determined Source and Destination Coordinate that are personally relevant to a user. The Personal Profile is the default User Profile. Recipient and Group Profiles are optional features that enable the system to display content that is personally relevant to the user's recipient(s). The determination or selection of one of the types of User Profiles establishes the User Context which, when merged with the Geographic Context of both Source and Destination locations, establishes a Geographic Shopping Session Context ('Session Context') for either personal shopping or gift giving. The User Context may be changed by changing the User Profile, or by 'user-deliberate requests' as explained in reference to FIG. 2B below. The Geographic Context may be changed by changing either the Source or Destination Coordinate. Both the User Context and Geographic Context may be changed repeatedly within the same session to establish new Session Contexts.

The Source Webpage Database 112 comprises a Webpage ('Source Webpage') for each Source Geographic Shopping Coordinate. Each Source Webpage is an Internet page to which users can be hyperlinked from outside the system 100 via system-external Internet accessible digital content and advertisements (see FIG. 7, Initiating a Geographic Shopping Session From Outside the System). When the user selects the hyperlinked external content or advertisement the server 110 receives the request to display the corresponding Source Webpage represented by the user selected URL. The server 110 then saves the user's IP address and the selected URL in order to coordinate subsequent responses from the same user. The Source Webpage displays a prompt for the user to select a Destination Coordinate. The system processor 111 then uses the saved URL of the Source Webpage to determine the Source Coordinate along with the user selected Destination Coordinate to determine the pair of Geographic Shopping Coordinates that correspond to a S/D sub-database in the Geographic Shopping Database 112. From the Source Webpage users can also be prompted to select a travel commerce category, log in to the system and make additional user-deliberate requests which enables the system 100 to display a filtered list of travel commerce content elements from the selected S/D sub-database.

Assignment of Content Elements to a Source/Destination Sub-Database

Figure 3A:
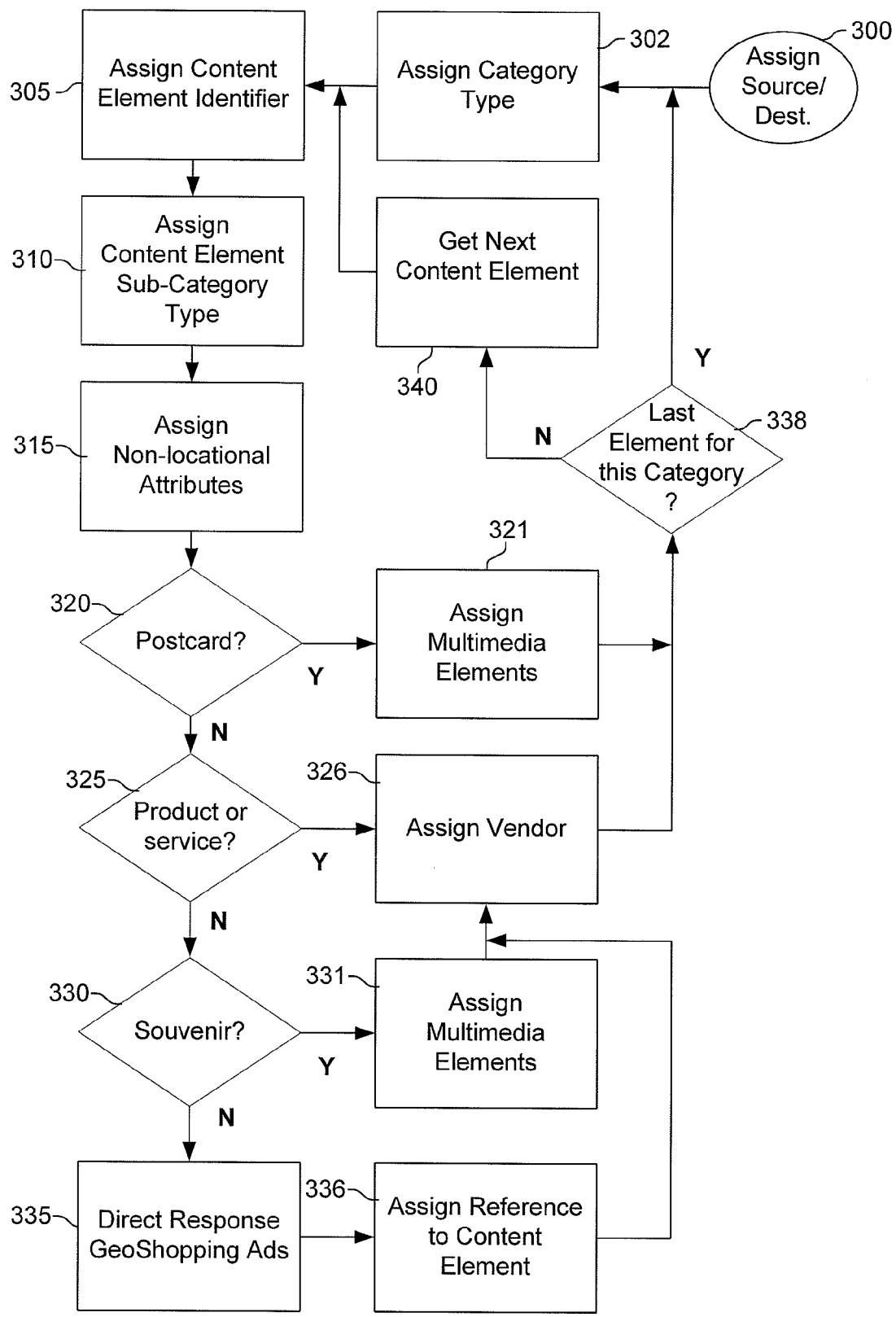
FIG. 3A is a diagram of an exemplary method showing the creation of a Source/Destination sub-database by assigning travel commerce content elements to data records.

FIG. 3A is a diagram of an exemplary method showing the creation of a Source/Destination sub-database 112(*) by assigning travel commerce content elements to data records. Table 1 shows exemplary contents of a Source/Destination sub-database 112(*), which includes a plurality of data records, each comprising a content element and corresponding identifying information, including sub-category type, non-locational attributes, and vendor. Operation of the present system is best understood by viewing FIG. 3A and Table 1 in conjunction with one another.

TABLE 1

Exemplary Source-Destination Sub-Database
Source-Destination Geographic Shopping Coordinates:
France (Source); USA (Destination)

Travel Commerce Category: Products
    Content Element (1): Baccarat Crystal Heart
        Content Element Sub-category Type
            Household Items
        Non-locational Attributes
            Price Range:   $50–$100
            Age Range:   25–64
            Gender:   F
        Vendor: Gumps, San Francisco
    Content Element (2): Ready to Bake Croissants
        Content Element Sub-Category Type:
            Gourmet Food Item
        Non-locational Attributes:
            Price Range:   $25–$50
            Age Range:   35–54
            Gender:   M, F
        Vendor: Williams-Sonoma
    Content Element (n)
Travel Commerce Category: Services
        [Same fields as Products]
Travel Commerce Category: Postcards
    Content Element (1): Paris at Night
        Content Element Sub-Category Type:
            Video Postcard
        Non-locational Attributes:
            Price Range:   $0 (Free)
            Age Range:   21–99
            Gender:   M, F
        Multimedia Elements:
            Video Clip of 'Paris by Night'
            Audio Clip of "I Love Paris in the Springtime"
    Content Element (n)
Travel Commerce Category: Customized Souvenirs
    Content Element (1): Lakers 2001 World Championship T-shirt
        Content Element Sub-Category Type:
            T-shirt
        Non-locational Attributes:
            Price-Range:   $1–$20
            Age Range:   9–16
            Gender:   M
        Multimedia Elements: None
        Vendor/Manufacturer: I-Print
Travel Commerce Category: Direct Response GeoShopping Ads
    Content Element (1): Ad for Baccarat Crystal Heart
        Content Element Sub-Category Type:
            Household Items TABLE 1-continued Exemplary Source-Destination Sub-Database
Source-Destination Geographic Shopping Coordinates:
France (Source); USA (Destination)

Non-locational Attributes
            Price Range:   $50–$100
            Age Range:   25–64
            Gender:   F
    Link to Existing Content Element: Content Element (1)
(Baccarat Crystal Heart)
        Vendor: Gumps, San Francisco As shown in FIG. 3A, at step 300, the system 100 assigns a Source/Destination coordinate pair to the Source/Destination sub-database 112(*) to be created. In the example shown in Table 1, the Source/Destination coordinate pair is "France" and "USA". Each available content element for a given Source and Destination is associated with identifying information to create a data record in the corresponding Source/Destination sub-database 112(*). In the present example (as shown in Table 1), a data record is created for a "Baccarat Crystal Heart". The first step in creating a travel commerce content element data record is to assign a category type to the content element (step 302). Next, at step 305, a content element identifier is assigned to the content element. In this example, "Baccarat Crystal Heart" is assigned as the identifier for content element (1) and the category type is "Products". Next, a travel commerce content element sub-category type is assigned to the content element (step 310). Here, the sub-category type is "Household Items". Non-locational attributes are then assigned to the content element (step 315). In the present example, the non-locational attributes for the Baccarat Crystal Heart are price range=$50–$100, age range=25–64, and gender=F.

If, at step 320, the travel commerce category is a postcard, then multimedia elements are assigned to the content element (step 321). Examples of multimedia elements are shown in Table 1 for a video type postcard of Paris at Night to which a video clip and an audio clip are assigned.

If, at step 325, the travel commerce category is a product or service, then a vendor is assigned to the content element (step 326). The vendor in the present example for content element (1) is "Gumps".

At step 330, if the travel commerce category is a customized souvenir, and there are any corresponding Multimedia elements to be assigned, these are assigned in step 331. A vendor/manufacturer is assigned to the souvenir at step 326.

If the travel commerce category is none of the above types, then by default (step 335), it must be a direct response GeoShopping ad, which is assigned a reference to a content element within the same Source/Destination sub-database 112(*) (step 336) and a vendor (step 326). The example in Table 1 of the direct response GeoShopping ad refers to content element (1) (the Baccarat crystal heart) as the advertised product.

The above-described process of assigning content elements and corresponding identifying information to records in Source/Destination sub-databases 112(*) is repeated for each additional content element (steps 338/340) in the present category. Then, the same sequence of steps 302/340) is repeated for the next category type ("Services", in the example shown in Table 1). After all content elements have been assigned to each category type in a given sub-database 112(*), the above process is repeated for each remaining sub-database 112(*) for which there is a Source/Destination coordinate pair.

Geographic Shopping Session

Figure 2A:
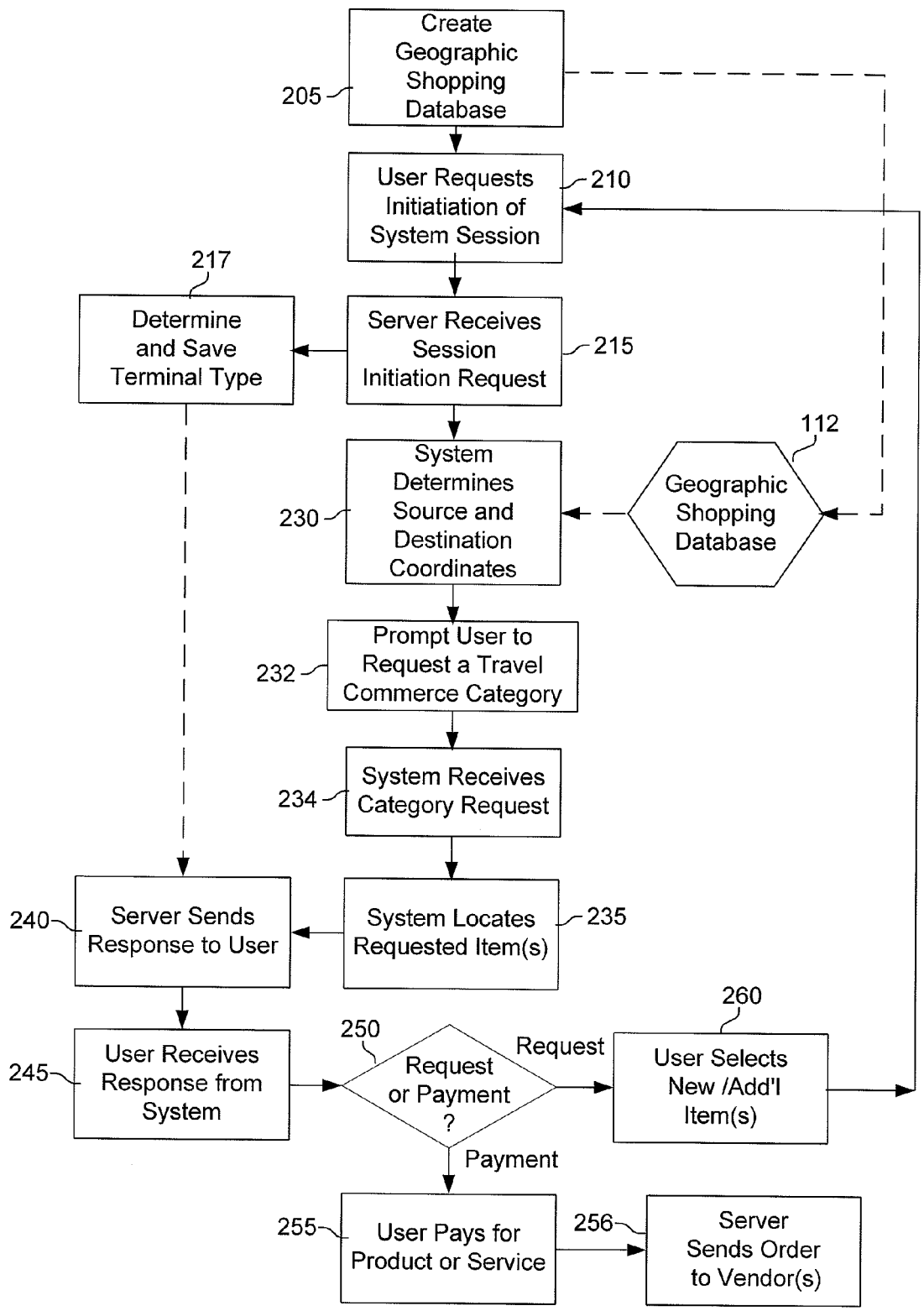
FIG. 2A illustrates an exemplary basic Geographic Shopping Session.

FIG. 2A illustrates an exemplary basic Geographic Shopping Session, in which the system 100 selects and presents travel commerce content elements to remote users, based on Source and Destination Geographic Shopping Coordinates. As shown in FIG. 2A, in preparation for the Geographic Shopping Session, a Geographic Shopping Database 112 is created (step 205). A Geographic Shopping Session begins when a user requests the initiation of a system session (step 210). A user can initiate a session by deliberate action in a number of ways, e.g., by typing in or otherwise selecting an Internet URL from a personal computer, by accessing a voice portal number from a telephone or by voice over the Internet, by touching a touch-screen kiosk, by clicking on an online advertisement, and the like (all of these types of sessions may be initiated from user terminal 101). A system session can also be initiated automatically, e.g., by the user answering a phone call received from the system inviting the user to begin a session.

The system server 110 (shown in FIG. 1) receives the session initiation request from the user (step 215) and determines and saves the terminal type (step 217). 'Terminal type' refers to the type of access device through which the user interacts with the system. Separate renderings of the system output format exist for each terminal type. Examples of user terminal types for user terminal 101 include a kiosk, PC, laptop, web-enabled television, telephone, cellular phone, personal digital assistant (such as a Palm Pilot), etc. In one embodiment, users can conduct an entire Geographic Shopping Session telephonically (e.g., via a voice portal with a telephone as the user terminal 101). The system uses the terminal type to determine how to send requested items to users (step 240) in a format that best fits within the hardware and software capabilities of the device used to access the system. For example, the maximum number of content elements presented to a phone user is fewer than for a PC user. Similarly, items sent to a PC user may contain graphics not sent to a phone user.

Next, the system determines the Source and Destination Coordinates (step 230). Determining the Source and Destination Geographic Shopping Coordinates allows the system to select the corresponding Source/Destination sub-database located in the Geographic Shopping Database 112, and display its content. Source and Destination Coordinates can be determined from user input, i.e., selected manually, or from default values The primary default Source Coordinate is the country, city or region in which the buyer is physically located. In an exemplary embodiment, a Geographic Shopping kiosk (one possible type of user terminal 101) has a default Source geographic location based on the physical location of the kiosk. A default Source Coordinate can be acquired automatically by a predetermined response from the terminal containing the terminal's location, the presence of a global positioning device in the device being used to access the system, or by monitoring the broadcast signal of the user terminal's communication system and triangulating the user terminal's location. The relevant Source Geographic Shopping Coordinate can also be acquired from the telephone number dialed to access the Internet. In an embodiment of the present invention, the Destination geographic location value defaults to the city or region in which the user resides. As an example, the system 100 accesses the user's or the recipient's address from the corresponding User Profile in the User Profile Database 115 to determine the default Destination Coordinate (See FIG. 2B). Whether the Geographic Shopping Coordinates are set manually or by default in the Geographic Shopping session the system determines both the Source and the Destination Coordinates then selects the corresponding Source/Destination sub-database to display its contents.

At step 232 the system prompts the user to request a travel commerce category, and at step 234 the system receives the category request. In an alternative embodiment the travel commerce category is predetermined based on the type of device employed by the user or the source of the user request to initiate the Geographic Shopping session. For example, a single purpose souvenir kiosk would only have one travel commerce category, i.e., only souvenirs content elements in the S/D sub-databases 112(*). A corporate Intranet, as the source of the initiated system session, may only offer 'Products' as the travel commerce category for corporate gifting purposes.

Once the system selects the matching Source/Destination sub-database 112(*), it locates the requested item(s) (step 235) in the selected travel commerce category, located in the Source/Destination sub-database. At step 240 the server sends a response including requested item(s), which comprise Source/Destination sub-database content elements, to the user. At step 245 the user receives the response. Upon the receipt of the response from the system, at step 250, the user can either make additional deliberate requests or proceed to pay for the product or service. Here the user has the option to select new or additional item(s) (step 260) in which case the user thereby initiates a new system session (step 210). Examples of additional user-deliberate requests include non-locational attributes such as price range, age range, and gender (see Table 1), which the user manually selects, e.g., from a pull-down menu. Another example of a user-deliberate request is a manually selected content element sub-category type, e.g., household items, jewelry (see Table 1). Once the user has paid for the product or service (step 255) the server sends the order to the vendor(s) for the selected product(s) and service(s) (step 256).

Personalized Geographic Shopping Session

Figure 2B:
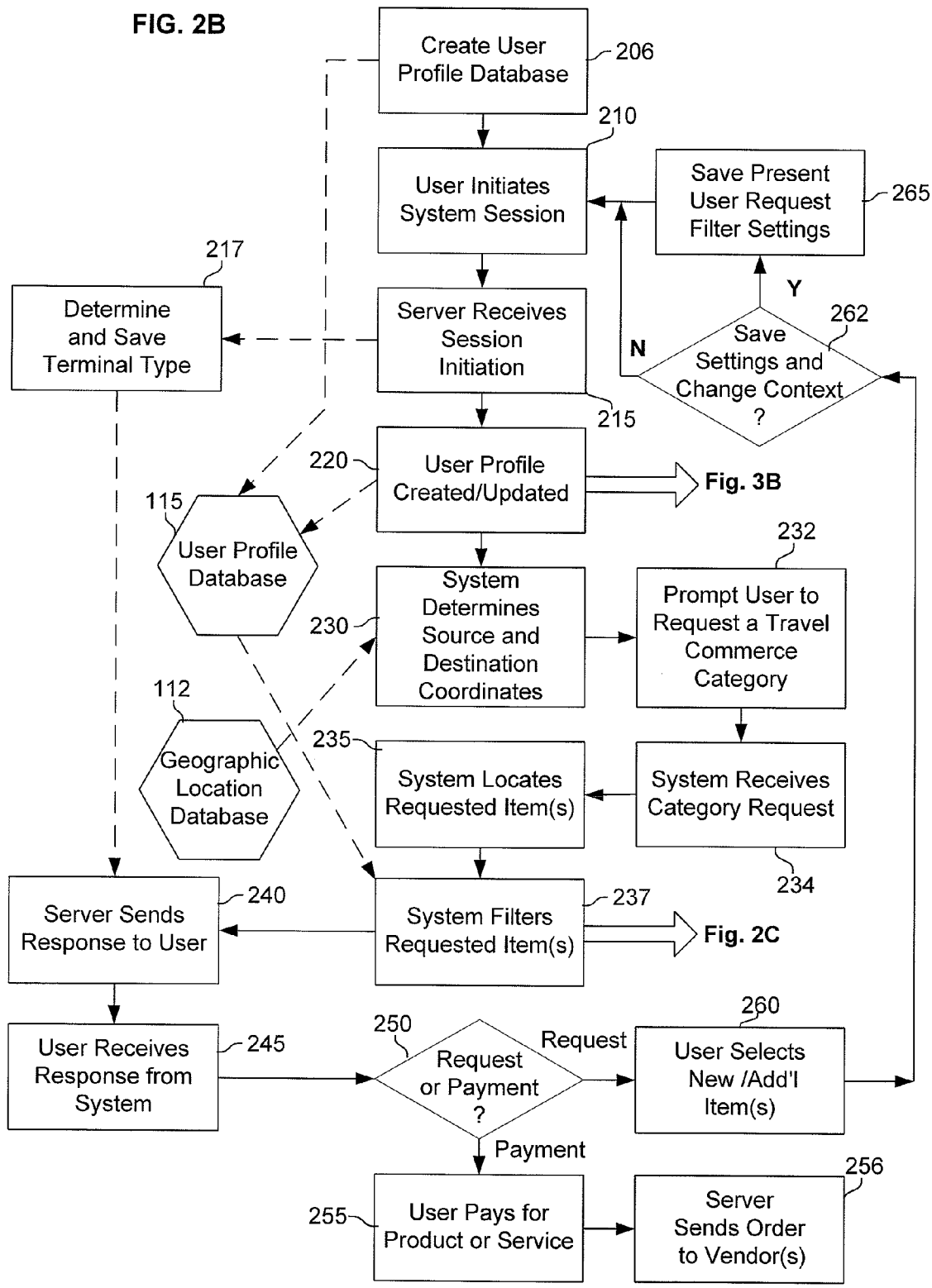
FIG. 2B illustrates an exemplary embodiment of a personalized Geographic Shopping Session.

FIG. 2B illustrates an exemplary embodiment of a personalized Geographic Shopping Session in which the system 100 selects and presents travel commerce content elements contained in a Source/Destination sub-database 112 (*) that has been filtered using a User Profile from the User Profile Database 115.

In preparation for a personalized Geographic Shopping Session (an optional aspect of the present system), a User Profile Database is created (step 206). The User Profile Database 115 is described in detail below with respect to Table 2. The session begins when a user requests the initiation of a system session (step 210). A user can initiate a session by deliberate action, or the session can be initiated automatically, as explained with respect to FIG. 2A. The server receives the session initiation request (step 215) and determines and saves the terminal type (step 217), for use in sending requested items to users (step 240). In an embodiment, users can conduct an entire Personalized Geographic Shopping Session telephonically (e.g., via a voice portal with a telephone as the user terminal 101). When the server receives the session initiation (step 215), the system creates or updates a User Profile (step 220), as explained further with respect to FIG. 3B. The system continues to update the User Profile in the User Profile Database 115 as the session proceeds. Next, the system determines the Source and Destination Coordinates (step 230) as explained with respect to FIG. 2A.

At step 232 the system prompts the user to request a travel commerce category, and at step 234 the system receives the category request. Once the system selects the matching Source/Destination sub-database, it locates the requested item(s) (step 235) in the selected travel commerce category in the Source/Destination sub-database 112 (*). The system further filters the requested item(s) by using the User Profile and/or by using user-deliberate requests (step 237—see description of FIG. 2C, below).

At step 240 the server sends a response including requested item(s), which comprise Source/Destination sub-database content elements filtered by the User Profile and/or user-deliberate requests, to the user. At step 245 the user receives the response. Upon the receipt of the response from the system, the user can either make an additional request (step 250) or proceed to pay for the product or service. At step 260 the user has the option to select new or additional item(s). A new system session is initiated (step 210) if the user chooses to select more items. Alternatively, if the user decides to pay for the product or service (step 255), the server sends the order to the vendor(s) for the selected product(s) and service(s) (step 256).

At step 262 the user is prompted to save the 'user request filter settings' from the current system session prior to initiating the new system session at step 210. At step 265 the system saves the current user request filter settings (see below for details on saving user request settings).

Figure 2C:
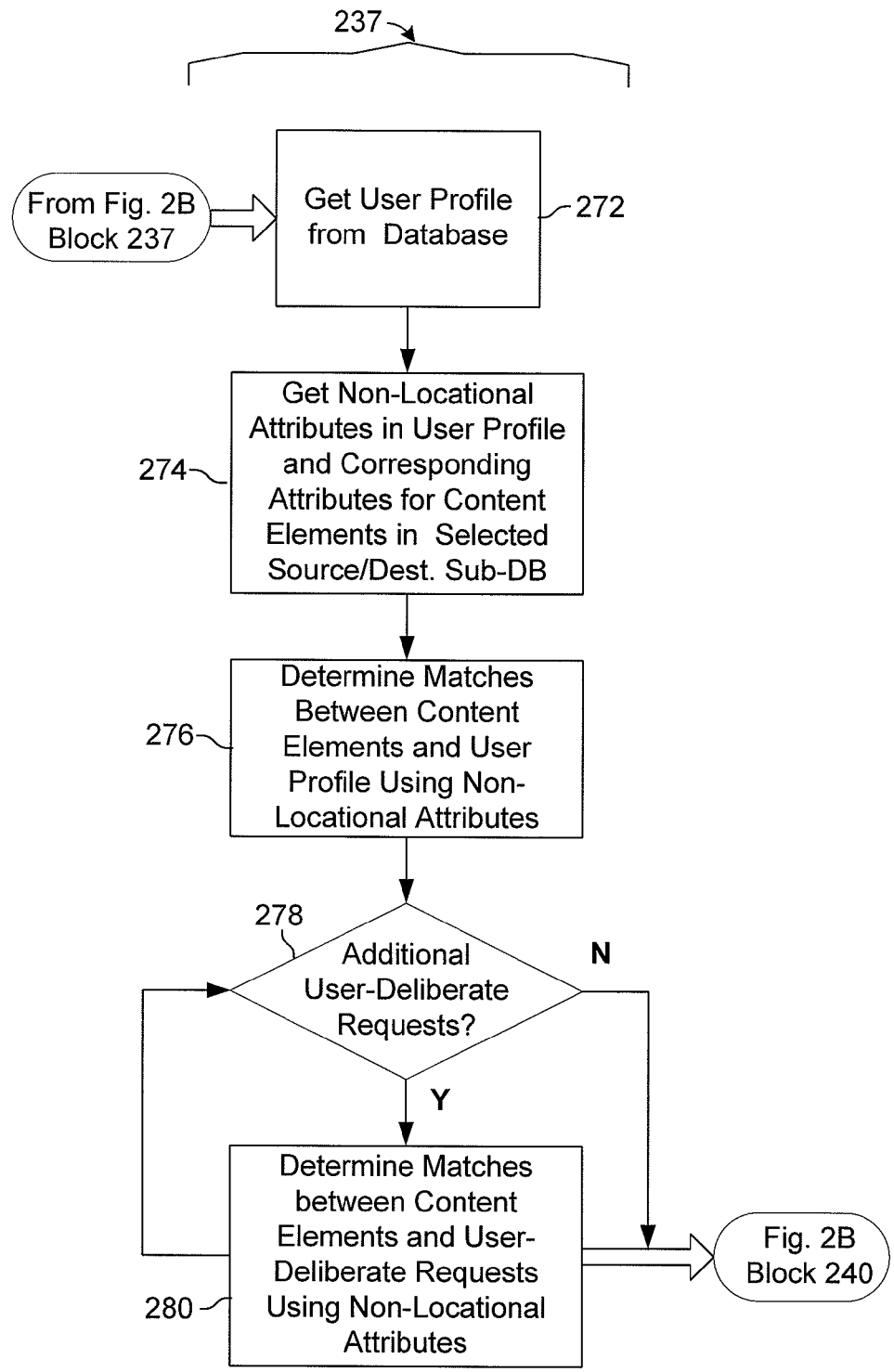
FIG. 2C provides an exemplary overview of filtering data in a Source/Destination sub-database, using the user profile and user-deliberate requests.

Filtering Data in Source/Destination Sub-Database Using User Profiles and User-Deliberate Requests FIG. 2C provides an overview of filtering data in a Source/Destination sub-database, using the user profile and user-deliberate requests. After the system 100 locates the requested item(s) (FIG. 2B, step 235), which correspond to content elements in a Source/Destination sub-database 112 (*), the User Profile is retrieved from the User Profile Database 115 (step 272). As discussed with respect to FIG. 3B, the profile can be previously established, e.g., by a system member having filled out a form, or it can be automatically established, based on a temporary default User Profile.

Table 2 illustrates the types of data stored in an exemplary User Profile Database.

TABLE 2

| User Profile Database |
|---|
| User Profiles |
|    Personal Profile |
|    [Example:] |
|       User Name: |
|          Jane Jetsalot |
|       User Preferences & Attributes |
|          Price Range: $50–100 |
|          Age: 30 |
|          Gender: F |
|    Recipient Profile |
|       Recipient Name |
|       Recipient Preferences and Attributes |
|    Group Profile |
|       Group Name |
|       Group Preferences and Attributes |

Using the user's name, the system retrieves the User Preferences and Attributes from the Personal Profile segment of the User Profile, and the corresponding attributes for the content elements in the selected Source/Destination sub-database 112(*) (step 274). The system determines matches between content elements and the User Profile using non-locational attributes (step 276), which generates a filtered list of content elements matching a user's profile. Using the examples shown in Tables 1 and 2, it can be seen from Table 2 that the personal profile for Jane Jetsalot includes non-locational attributes for products in the $50–$100 price range, an age of 30, and a gender of F(Female). Table 1 shows that content element (1) in the Source/Destination sub-database for France/USA includes non-locational attributes ($50–$100 price range, an age range of 25–64, and a gender of F) that fall within the parameters of those for content element (1). Therefore, content element (1), the Baccarat Crystal Heart would be on the resulting filtered list of content elements from the France/USA Source Destination sub-database.

Next, the system determines whether the user has made additional deliberate requests (step 278). Examples of additional user-deliberate requests are manually selected non-locational attributes such as price range, age range and gender (displayed from a pull-down menu). Another example of a user-deliberate request is a manually selected content element sub-category type, e.g., household items, jewelry (see Table 1). A user can also make a deliberate request to change the user profile (e.g., from a personal profile to a recipient or group profile. See Table 2).

If the user makes no additional deliberate requests, the server sends the response to the user (FIG. 2B, step 240). If the user does make additional deliberate requests, the system determines matches between those requests and the filtered list from step 276, and generates a further filtered list of content elements (step 280). Continuing the example from above, if the user made a deliberate request of "male" for gender, the Baccarat Crystal Heart, which includes "female" as a non-locational attribute for gender, would not remain on the resulting filtered list at step 280. Next, the server sends the response to the user (FIG. 2B, step 240).

In one embodiment of the present invention, when a user is logged in to the system 100, direct response GeoShopping ads, from the selected Source/Destination sub-database 112 (*), containing non-locational attributes that correspond to the user preferences and attributes in the user's Personal Profile, may be displayed automatically (See Tables 1 & 2). Alternatively, a user may deliberately request the system 100 to display direct response GeoShopping ads in the form of product recommendations or gift suggestions. A product recommendation is the result of system 100 filtering the selected Source/Destination sub-database 112(*) using a Personal Profile, whereas a gift suggestion is the result of the filtering process when a Recipient or Group Profile is used (See Tables 1 & 2). This method of direct response advertising allows an advertiser to target customers based on both the buyer's interest in a particular geographic location and personal preferences at the potential point of purchase.

At step 262 the user is prompted as to whether the user wishes to maintain the user request filter settings from the previous session and also change the Geographic Context of the next session, i.e., change the Geographic Shopping Coordinates. The user request filter settings include the selected travel commerce category, the selected content element sub-category type (see Table 1) the selected User Profile (Personal, Recipient or Group) and any other user-deliberate request such as price range age range or gender. If not, the system initiates the new session at step 210. If the user wishes to maintain the present filter settings and change the Geographic Context, the system saves the user request filter settings (step 265) prior to commencing the new session that is also initiated at step 210. At step 230 the system prompts the user to manually determine a new Source Coordinate and either confirm the previous Destination Coordinate or determine a new one. This allows the system to select the corresponding S/D sub-database 112(*) for the new session context and display its content. With the filter settings maintained, the system 100 completes step 232, step 234, and step 235 automatically, as discussed with reference to FIG. 2B above. Next, at step 237 the system 100 filters the corresponding S/D sub-database 112(*) using the saved user request filter settings from the previous session and the server sends the response to the user (step 240). This procedure allows the user to shop from country to city to region with the same gift-buying criterion.

For example, at step 245, (see FIG. 2B), a woman (buyer) is unsatisfied with the response received from the system in her current Geographic Shopping session. The current session context indicates that she is shopping in England (Source Coordinate) for a watch (requested travel commerce category=products, requested content element sub-category=jewelry) having also requested that the system 100 use her husband's Recipient Profile (Recipient's Name=John Spendsalot) to filter the appropriate S/D sub-database 112(*). The Recipient Attributes and Preferences in the Recipient Profile are set as follows: gender=M, age=35 and price range=under $500. At step 250 the buyer is prompted to request new or additional items and makes that request at step 260. The buyer affirms the prompts to maintain the same buying criterion from the previous session context (step 262). The system 100 then prompts the buyer to select a new Source Coordinate, e.g. Switzerland, and either confirm the previous Destination Coordinate or select a new one (step 230). Next, the system locates the new S/D sub-database for the new session context (step 235) and filters the requested items based on the user request filter settings saved from the previous session context (step 237). At step 250 of the new session context, having received a favorable response from the system, the buyer selects payment and pays for the selected Swiss watch at step 255.

Create/Update Personal Profile in the User Profile Database

Figure 3B:
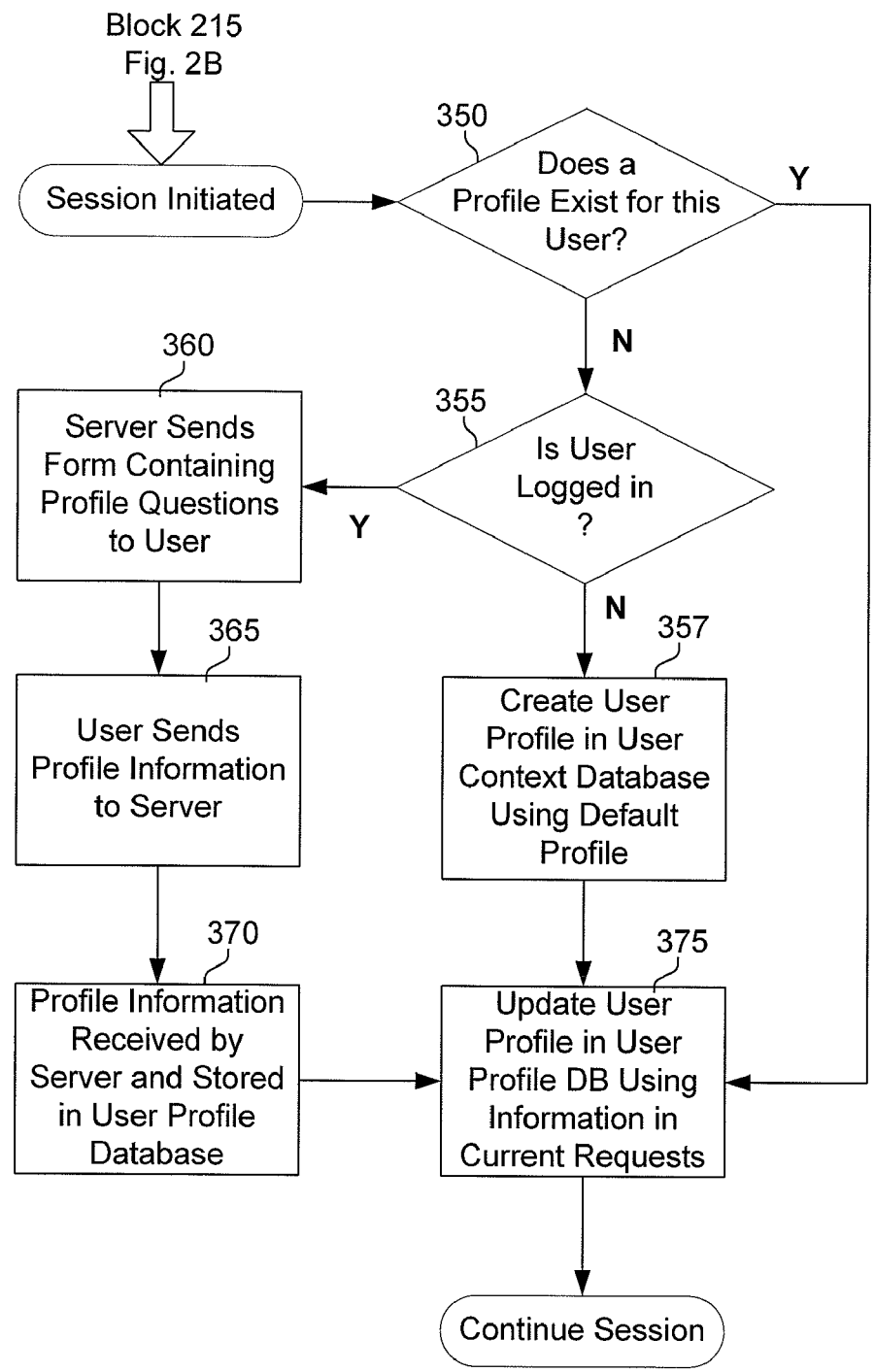
FIG. 3B provides an exemplary overview of an exemplary embodiment in which the system creates and/or updates a Personal Profile in the user profile database.

FIG. 3B provides an overview of an exemplary embodiment in which the system creates and/or updates a Personal Profile in the user profile database, which begins after a personalized geographic shopping session is initiated by a user and the session initiation is received by the system 100 server (FIG. 2B, step 215).

At step 350 the system checks the User Profile Database 115 to determine whether a Personal Profile exists for the user. The Personal Profile is the default User Profile. Recipient and Group Profiles are optional User Profiles used by the system 100 to filter S/D sub-databases 112(*) upon user-deliberate (see Table 2).

If a Personal Profile does exist—for example if the user has provided a valid login username and passcode, or if the user's terminal has a 'cookie' or other associated indicia that identifies his Personal Profile—then the system automatically updates that Personal Profile in the User Profile Database (step 375) using information in the current session request. The system continues to update the Personal Profile in the User Profile Database 115 as the session proceeds, using information contained in requests and other responses from the user.

If the system cannot locate a Personal Profile for this user, the system determines whether the user is logged in (step 355). If not, the system creates a temporary User Profile in the User Profile Database using a Personal Profile as the default User Profile (step 357). See Table 2. That temporary default profile is updated in the User Profile Database using information in the current session request (step 375). In this way it is possible for users who are system members to use the system without employing any of their User Profiles. Also in this way, because a temporary User Profile is automatically created by the system, users who are not system members can use the system without taking deliberate action (e.g., filling out a form) to establish a Personal Profile.

If a profile does not exist for this user, but the user is logged in (e.g., a user who logs in and has not yet established a Personal Profile but wants to do so), the server sends a form containing Personal Profile questions to the user (step 360). The server can send, automatically or upon the user's request, forms corresponding to any of the three types of User Profiles: Personal Profile, Recipient Profile, or Group Profile. The user returns the profile information to the server (step 365). The server receives the profile information and stores it in the User Profile Database (step 370). The system 100 then updates the Personal Profile in the User Profile Database using information in the current session requests (step 375). The system continues to update the Personal Profile in the User Profile Database 115 as the session proceeds and further feedback is received from the user.

Geographic Shopping Session for Postcards

Figure 4A:
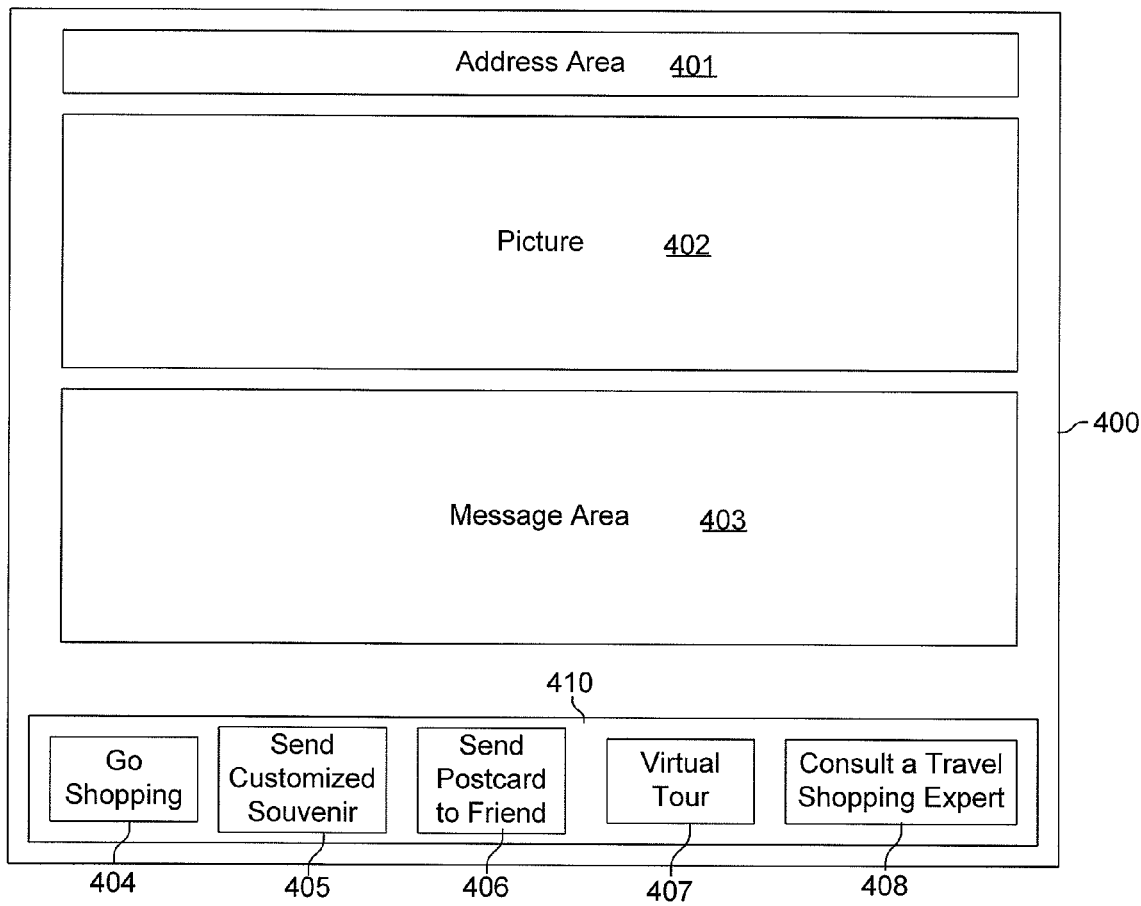
FIG. 4A illustrates an exemplary postcard as composed and delivered by the present system.

FIG. 4A illustrates an exemplary postcard as composed and delivered by the present system. In one embodiment of the present invention, a user may send postcards 400 from a first terminal 101 to a recipient who may use a second terminal 101, incorporating travel commerce content (products, services, customized souvenirs, direct response GeoShopping ads and additional postcard content elements) from a Source/Destination sub-database 112 (*) that corresponds to the Geographic Shopping Coordinates that have been determined in the user's (sender's) Geographic Shopping Session. Upon receipt of the postcard, the recipient is prompted to initiate a Geographic Shopping Session in one step (e.g., with a single 'click') because the Geographic Shopping Coordinates have been pre-determined in the sender's session. That single step is requesting a travel commerce category (see FIG. 2A step 232) which is accomplished by selecting button 404, 405, or 406 on the postcard toolbar (described below). Alternatively, upon receipt of the postcard, the recipient may go on a virtual tour associated with the Source geographic location of the postcard (button 407 on the toolbar), consult a travel shopping expert for product recommendations in the form of direct response GeoShopping ads (button 408 on the toolbar) or determine a different set of Geographic Shopping Coordinates to establish a new Geographic Shopping Session Context.

In an exemplary embodiment of the present invention, as shown in FIG. 4A, the postcard 400 has three basic components for the sender plus a Geographic Shopping Toolbar for the recipient. A first component 402 is an image of a tourist attraction, a monument or artwork or other image that is associated with a specific country, city or region. For example, the image on a card for Paris may be the Eiffel Tower. As described below the first component 402 may consist of video, a composite of many images together, or a slideshow, rather than one image. A second component 403 is an area in which a message to the receiver of the postcard may be included. A third component 401 contains an address area, where the address of the recipient is placed.

To initiate a Geographic Shopping Session in one step, the recipient may select a travel commerce option from a Geographic Shopping Toolbar 410 comprising toolbar buttons 404-408, which indicate, respectively, that the user may (1) 'go shopping' 404 for products or services, (2) customize a souvenir 405, (3) send a postcard to a friend 406, (4) go on a 'virtual tour' 407, and (5) 'consult a travel shopping expert' 408.

A virtual tour comprises a multimedia element or combination of multimedia elements assigned to a postcard content element. An example of a virtual tour is a video clip of "Paris at Night" (see Table 1).

By choosing button 408, a user initiates a Geographic Shopping Session (step 210 in FIG. 2A) or a personalized Geographic Shopping Session (step 210 in FIG. 2B) with an electronic customer service agent or Travel Shopping Expert, also referred to as an 'Electronic Assistant' 106. An Electronic Assistant is an intermediary between the buyer (via user terminal 101) and system server 110 that conducts an interactive Geographic Shopping session through a series of pre-formatted user prompts, questions and answers in the form of a text chat or by implementing voice recognition technology. In one embodiment the Electronic Assistant may be given a graphic or animated user interface. Button 408 can also initiate a Geographic Shopping Session via an Instant Message. An Instant Messaging ("IM") service is a proprietary network of servers that connects IM users when they chat, enabling them to communicate over the Internet in real time. AOL Instant Messenger(SM), MSN® Messenger Service and Yahoo!® Messenger are the major IM services. Additionally, Electronic Assistants can be used in conjunction with live customer service during a Geographic Shopping Session. TellMe.com offers an example of voice technology that can be employed for conducting a Geographic Shopping Session with an Electronic Assistant 106 when the user terminal 101 is a telephone or voice over the Internet. Activebuddy.com offers an example of interactive agent technology that can enable a Geographic Shopping session delivered directly into Instant Messenger windows and wireless devices.

Electronic Assistant actions include determining Geographic Shopping Coordinates (step 230) either manually or by default, prompting the user to select a travel commerce category (step 232) and make other user-deliberate requests (step 278), displaying system-filtered responses (either in the form of text and images or by speech response) based on the user's deliberate requests and/or a user's selected User Profile (step 240), prompting the user to log in, or create a User Profile to be stored in the User Profile Database 115 (steps 360).

In a Geographic Shopping session using an Electronic Assistant 106, the user can also make deliberate requests (step 278) for product and service recommendations or gift suggestions. In response to these requests the system 100 displays direct response GeoShopping ads in the form of text and graphics or by communicating the responses to the user by voice (step 240).

Figure 4B:
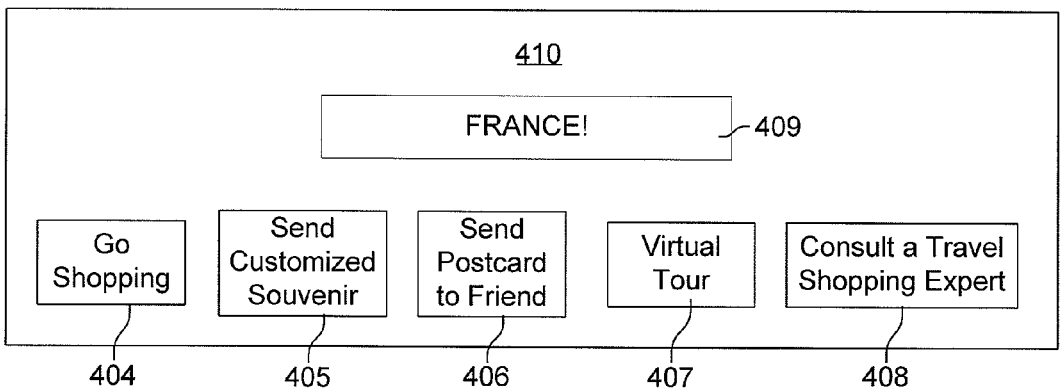
FIG. 4B shows an alternate embodiment in which the Geographic Shopping Toolbar is independent of the postcard.

FIG. 4B shows an alternate embodiment in which the Geographic Shopping Toolbar 410 is independent of the postcard 400. 409 is a text or image box that indicates the Source Geographic Shopping Coordinate, for example the word "France!" with a picture of the Eiffel Tower. In alternate embodiments, any toolbar button 404–408 can be employed as an independent icon that links to a Source Webpage in the Source Webpage Database 116 (see FIG. 7).

Figure 5:
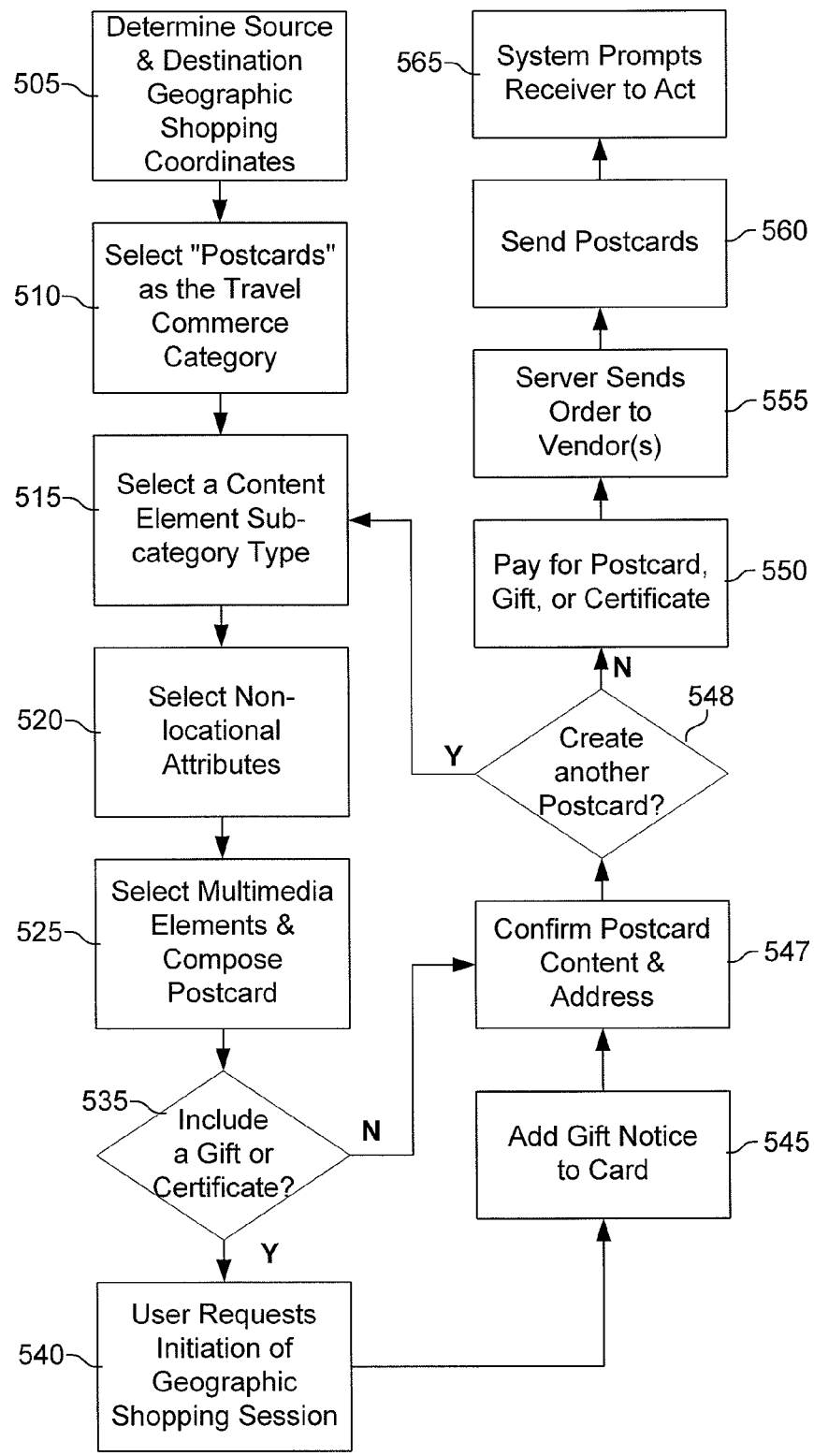
FIG. 5 provides an exemplary overview of a Geographic Shopping Session for postcards.

FIG. 5 provides an overview of a Geographic Shopping Session for postcards, in which the system 100 selects and presents postcard travel commerce content elements contained in a Source/Destination sub-database 112 (*). In one embodiment (FIG. 2B), the content elements have been filtered using a User Profile from the User Profile Database 115. In an alternative embodiment, the content elements have not been so filtered (FIG. 2A).

As presented in FIG. 2A and FIG. 2B, the Geographic Shopping Session is initiated and the system determines the Source and Destination Coordinates (step 505). At step 510 the user selects 'Postcards' as the travel commerce category. In another embodiment, e.g., where user terminal 101 is a single purpose postcard kiosk, 'Postcards' is the default travel commerce category. In the embodiments of FIG. 2A and FIG. 2B, users can conduct an entire Geographic Shopping Session, in this case for postcards, telephonically. Voice messages, from the postcard sender to the recipient, can be attached to the postcard.

At step 515, the user selects the content element subcategory type, in this case, a particular type of postcard. Examples of postcard types include single images, slide shows of a travel destination, a 360-degree panoramic view of a tourist attraction, video clips of monuments or artwork associated with a specific location. The user then selects non-locational attributes (step 520) such as postcards within a certain price range, postcards that would be most suitable for a male or female recipient (gender), and postcards for recipients within a certain age range.

The user may select additional multimedia elements to insert into the postcard (step 525). Multimedia elements are assigned to each postcard content element in Source/Destination sub-databases (see FIG. 3A). In an alternative embodiment the system 100 receives a selection of the type of multimedia content the user wishes to have as their multimedia element and generates a multimedia element content screen. The multimedia element content screen prompts the user to choose the content of the particular multimedia element type that the user selected. For example, the user selects "I Love Paris in the Springtime" from a list of three audio clips as the multimedia element type.

Other examples of multimedia elements that can be selected by the user (step 525) include geographically specific content including recipes, folk stories, poems such as haiku and limericks, sayings, logos, sports statistics, music, local news and information and stories about various members of a particular geographic locale including local celebrities. The promotion of local celebrities through postcards creates viral marketing and promotional opportunities.

In an alternative embodiment, at step 525, users choose multiple multimedia elements. Users continue to select multimedia elements until they are finished. To facilitate the use of multimedia content, sending site terminal 101 may include a microphone, a digital camera, and/or a scanner. The user can attach a voice message along with the postcard by speaking into the microphone. The users can attach, for example, a photo of themselves taken through the digital camera and create a composite image with another picture of a famous background (step 525). Once a picture of the user is entered into the system, it can be stored for future use on other postcards and with other backgrounds. The user can scan photos or documents into the scanner and send the generated graphic on their postcards.

Terminal 101 may also include speech recognition software and a microphone. Using the speech recognition software, the user speaks into the microphone and the speech recognition software processes the speech into message text. System 100 may also allow the user to check the spelling of their message. Additionally, the system 100 may include text to speech software and speakers, and provides the user with the option of having their text read back to them.

The user is prompted to include a gift or gift certificate at step 535. If the user does not choose to include a gift or gift certificate, at step 547 the user confirms the postcard content and addresses the postcard.

If the user requests to include a gift certificate, the system 100 prompts the user to request an amount that they wish to place on the gift certificate. The system then displays the gift certificate content element from travel commerce category of "Services" in the selected Source/Destination sub-database 112 (*) that matches the user's request. Optionally, the currency type defaults to the recipient's native currency based on the Destination Geographic Shopping Coordinate. Gift certificates may be applied by the recipient to a purchase of a product or service selected from the default Source/Destination sub-database or from any other sub-database in the system. At step 547 the user confirms the postcard content and addresses the postcard.

If the user requests to send a gift a Geographic Shopping Session is initiated in step 540 (see FIG. 2A and FIG. 2B). When the user has selected the final gift(s) to be included with this postcard, at step 545 the system adds a notice to the postcard indicating the gift(s) that accompany the postcard. At step 547 the user confirms the postcard content and addresses the postcard. Alternatively, a user can send the same postcard to multiple addresses.

At step 548 the user has the option of composing another postcard, in which case the user is prompted to select a content element sub-category type (step 515). In this way a user can compose multiple postcards without having to pay for each postcard individually.

When the user has composed all desired postcards, at step 550 the user pays for the postcard(s) and gifts or gift certificates, and at step 555 the server sends the order(s), e.g., for gifts, to vendor(s) and/or manufacturer(s). At step 560 the system sends the postcard(s) and at step 565, the system prompts the receiver to act, i.e., select a travel commerce option from the Geographic Shopping Toolbar (see FIG. 4A and FIG. 4B).

Geographic Shopping Session for Customized Souvenirs

Figure 6:
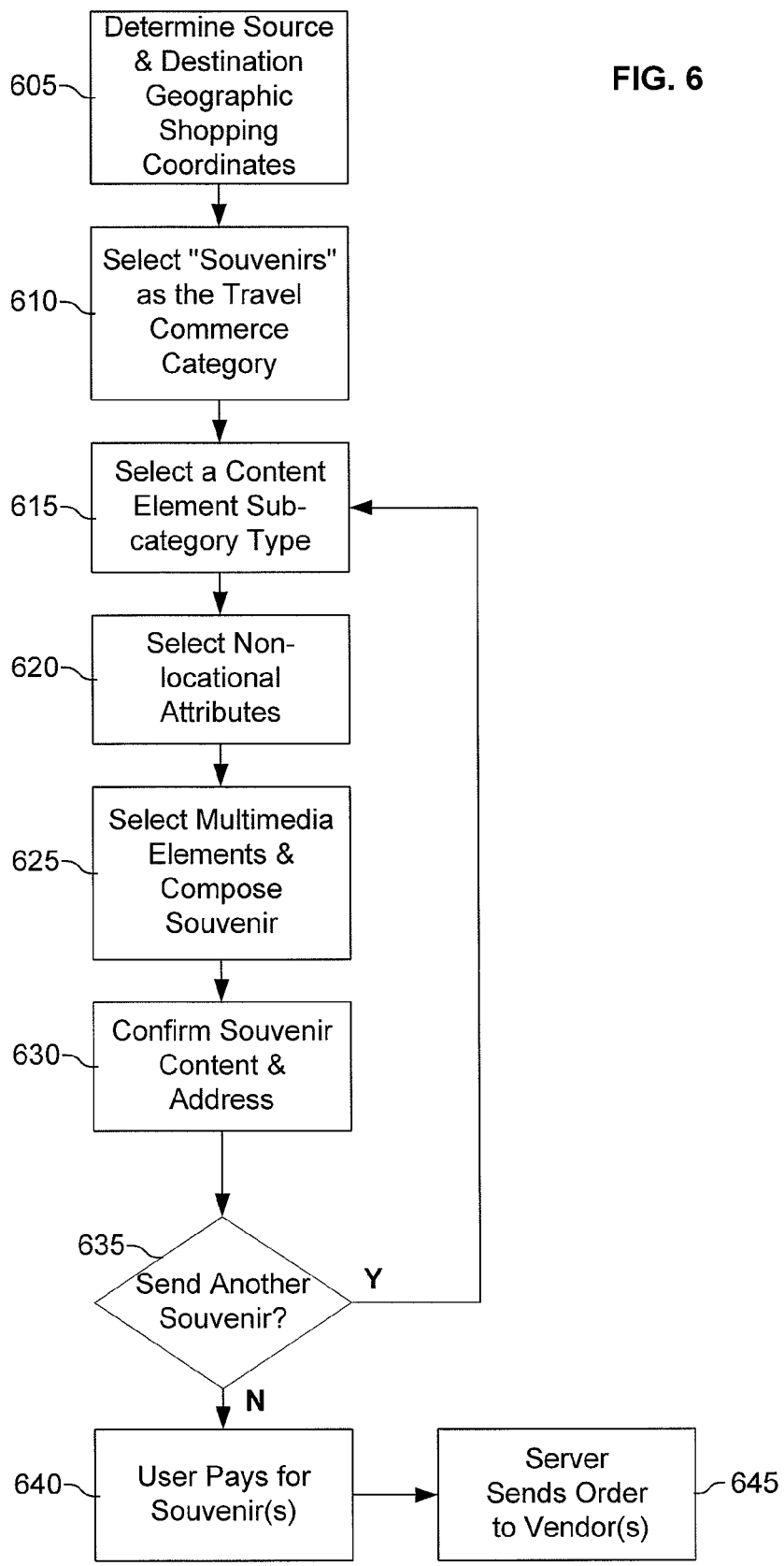
FIG. 6 provides an exemplary overview of a Geographic Shopping Session for Customized Souvenirs.

FIG. 6 provides an exemplary overview of a Geographic Shopping Session for Customized Souvenirs, in which the system 100 selects and presents customized souvenir travel commerce content elements contained in a Source/Destination sub-database 112 (*). In one embodiment (shown in FIG. 2B), the content elements have been filtered using a User Profile from the User Profile Database 115. In the embodiment shown in FIG. 2A, the content elements have not been so filtered.

As described with respect to FIG. 2A and FIG. 2B, the Geographic Shopping Session is initiated and the system determines the Source and Destination Coordinates (step 605). As indicated in the embodiments described with respect to FIG. 2A and FIG. 2B, users can conduct an entire Geographic Shopping Session, in this case for customized souvenirs, telephonically.

At step 610 the user selects "Souvenirs" as the travel commerce category. If user terminal 101 is a single purpose souvenir kiosk, "Souvenirs" is the default travel commerce category. Alternatively, "Souvenirs" may be the only travel commerce category made available to the user.

At step 615 the user selects a content element sub-category type (e.g., T-shirts, hats, mugs, mouse pads, posters, calendars, CDs, greeting card sets, puzzles, magnets, and picture booklets). At step 620 the user selects non-locational attributes of the souvenir, e.g., price range, age range, and gender. At step 625, the user selects multimedia elements and composes the souvenir. Examples of multimedia elements are images, text, embroidery, audio and video clips or combinations of these elements. In an embodiment for users desiring quick orders, the user is presented with souvenirs that are pre-formatted, e.g., with pre-selected non-locational attributes and multimedia elements.

At step 625, users may choose multiple multimedia elements. Users continue to select multimedia elements until they are finished. In another embodiment, users are prompted to enter multimedia elements of their own to personalize the customized souvenir. Alternatively, a user may upload digital elements that can be incorporated into the souvenir. For example, a user at a terminal 101 having a digital camera or a scanner connected thereto may upload images. The user is then prompted to format the uploaded digital elements, as with other digital images.

At step 625, the user is optionally prompted to add text to the souvenir. If the user elects to add text, the user is prompted to type the text that they wish to add. The text is provided in a default font of a predetermined size and color. In an additional embodiment, the user is prompted to change the text font, size and color. The user is also prompted to place the text on the souvenir in relation to the digital image. For example, if the souvenir is a T-shirt, then the user is prompted to place the text on one side of the T-shirt and the photograph on another. Users are optionally prompted to upload their own text, such as a personal poem, and format it in the same manner as entered text, on the souvenir.

As a further alternative, a user may choose images as multimedia elements. In this situation, the user is prompted to insert description information including such text elements as history or a story about the digital image, stored along with the image (step 625). This may be particularly desirable for calendars, posters, and booklets of images.

Souvenirs are optionally capable of playing sounds and video. In this case, the user is prompted to select audio and video elements (step 625). Additionally, the user may be prompted to enter their own sounds and video either through a microphone or camera built into the user device or through additional devices connected to the user terminal 101. Users may also upload their own still images, audio or video elements from various sources, such as a Compact Flash® card, CD, MEMORY STICK®, and a SMART MEDIA® memory card.

Alternatively, at step 625, groups of digital images may be selected to form customized souvenir booklets of digital images or to form calendars. If, for example, a user chooses to create a customized calendar, the user may be prompted to select twelve different digital images, with each image corresponding to a particular month, or if a weekly calendar is to be created, the user is then prompted to select 52 digital images.

Once the user selects one or more digital elements or text elements, the user is prompted to compose the souvenir by organizing the placement of the digital images and content on the customized souvenir. The user may be, for example, prompted to alter the size of each digital image and sizable content element and to place each digital image and text element in a location on a souvenir. For example, if the souvenir is a T-shirt with a pocket on the front, the user may place a digital image on the back of the tee-shirt, then resize the same image or a different image for placement on the pocket on the front of the T-shirt.

At step 630 the user confirms the souvenir content and address to which the souvenir will be sent. A user may optionally send the same souvenir to multiple addresses. At step 635 the user has the option of composing another souvenir, in which case the user is prompted to select a content element sub-category type (step 615). In this way a user can compose another type of souvenir, e.g., a calendar after already having composed a T-shirt, without having to pay for each souvenir individually.

When the user has composed all desired souvenirs, at step 640, the user pays for the souvenir(s), and at step 645 the server sends the order to the appropriate vendor(s) and/or manufacturer(s).

Initiating a Geographic Shopping Session from Outside of the System

Figure 7:
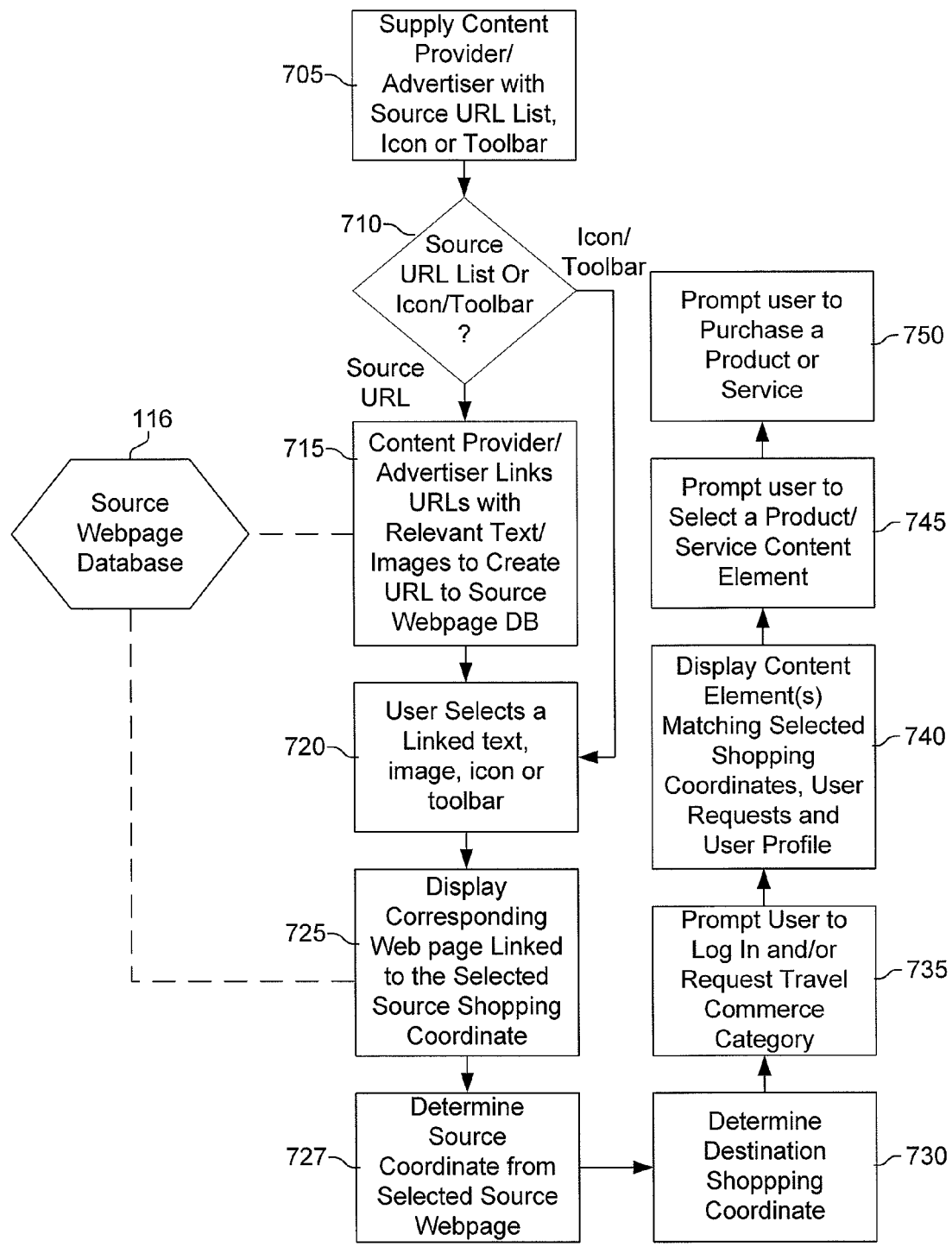
FIG. 7 illustrates an exemplary embodiment of a Geographic Shopping Session that is initiated by a buyer from outside of the Geographic Shopping System, via system-external Internet accessible digital content or advertisements.

FIG. 7 illustrates an exemplary embodiment of a Geographic Shopping Session that is initiated by a buyer from outside of the Geographic Shopping System 100, via system-external Internet accessible digital content or advertisements (e.g., while in the process of travel research on a remote website or while engaged in a travel related entertainment session via an Internet connectivity device). Initially, a potential buyer connects, via the Internet, to a website, an advertisement or other Internet accessible digital content, that is external to the system 100 ('system-external content or ad'). Text, images, icons or toolbars that are hyperlinked to the system 100, are displayed on or embedded in the system-external content or ads. A user viewing the hyperlinked content may then select the hyperlinked text, image, icon or toolbar that is linked to related HTTP-formatted text in a Source Webpage from the Source Webpage database 116, in order to begin a Geographic Shopping Session. For example, a user may be researching a future trip to Paris in a digital travel guidebook or a digital travel magazine article in which an icon 404 appears prompting the user to "Go Shopping in Paris". When the user selects the icon (at step 720, described below) the Paris Webpage, located in the Source Webpage Database 116, is displayed.

As shown in step 705 of FIG. 7, digital content providers, Internet advertisers and other electronic marketers are supplied with Source URL lists (See Table 3, below), Geographic Shopping Toolbars 410 and Icons 404–408 for the purpose of incorporating them in their system-external Internet accessible digital content and advertisements.

TABLE 3

Source URL List

| | |
|---|---|
| France | http://www.france.shopworldz.com |
| Eiffel Tower | http://www.france.eiffeltower.shopworldz.com |
| Notre Dame | http://www.france.notredame.shopworldz.com |
| Mona Lisa | http://www.france.monalisa.shopworldz.com |
| Croissants | http://www.france.croissants.shopworldz.com |
| Bordeaux Wine | http://www.france.bordeauxwine.shopworldz.com |
| Champagne | http://www.france.champagne.shopworldz.com |
| Italy | http://www.italy.shopworldz.com |
| Vatican | http://www.italy.vatican.shopworldz.com |
| Coliseum | http://www.italy.coliseum.shopworldz.com |
| Pasta | http://www.italy.pasta.shopworldz.com |
| Chianti Wine | http://www.italy.chiantiwine.shopworldz.com |
| Pizza | http://www.italy.pizza.shopworldz.com |
| Espresso | http://www.italy.expressoshopworldz.com |

Step 710 indicates that there are separate actions taken for Source URL lists and icon/toolbars. For Source URL lists, step 715, content providers and advertisers correlate geographically relevant text and images with a corresponding Source URLs to create a link from their text and images to the Source Webpage Database 116 in the system 100. Icons and toolbars are placed on digital content in proximity to geographically relevant text and images. Icons and toolbars can also be superimposed on geographically relevant video content that can be displayed on an interactive Internet connectivity device.

At step 720 the user selects a linked text, image, icon or toolbar. The system 100 then displays the corresponding Webpage from the Source Webpage Database 116 that is linked to the selected Source Shopping Coordinate (step 725). In this step the user concurrently initiates a Geographic Shopping Session (see FIGS. 2A & 2B, step 210) and the system receives the session initiation (FIGS. 2A & 2B, step 215). At step 727 the system determines the Source Geographic Shopping Coordinate for the session based on the selected Source Webpage. In step 730 the Destination Shopping Coordinate is determined.

In step 735 the system 100 prompts the user to log in and/or request a travel commerce category. The system then displays content elements that match the selected shopping coordinates, the user's requests and the User Profile (step 740). The user is prompted to select a product or service content element in step 745, and then is prompted to purchase the product or service (step 750).

Geographic Shopping Sessions may also be initiated from outside of the system by linking text and images (Table 3), icons 404–408 and toolbars 410 from digital advertising and marketing formats to Source Webpages from the Source Webpage Database 116. Examples of these formats include banner ads, Instant Messaging sessions, direct e-mail solicitations and e-mail or IM alerts.

In an alternative embodiment, icons 404–408 can be encoded with a bar code or other digital coding element and incorporated in a physically located, Internet-accessible display advertisement. In this embodiment the icon can be recognized by a remote wireless user terminal 101 that is in physical proximity to the display ad, e.g., by using a handheld device such as a Palm Pilot equipped with Bluetooth technology (bluetooth.com). For example, a user at the airport in Los Angeles, waiting for a flight back home to Canada, may use a wireless device to select a display ad for Disneyland, and initiate a Geographic Shopping session for last minute travel gift buying. Alternatively, the display ad can prompt a session initiation or send a direct response GeoShopping advertisement (e.g., using Bluetooth technology) directly to the user's remote wireless device 101 when the user is in physical proximity to the display ad.

Alternatively, a Geographic Shopping Toolbar 410 or icons 404–408 may be incorporated into the software for a digital photo album that prompts both the user and invitees to initiate a Geographic Shopping Session associated with the Source location of a vacation photo album. Toolbars and icons placed on photo albums are also linked to Source Webpages in the Source Webpage Database 116.

Geographic Shopping Sessions may also be initiated from Interactive Television (ITV), both from programming content and from program guides. ITV content providers, and/or producers of content for ITV are supplied with Source URL lists (Table 3), icons 404–408 and toolbars 410. Geographically relevant text and images in a digital television guide may be linked to corresponding Source Webpages in the Source Webpage Database 116. A plurality of icons 404–408 and toolbars 410 may be placed within a single program or movie as the geographic context of the content changes from one Source geographic location to another. Icons 404–408 and toolbars 410 linked to Source Webpages in the Source Webpage Database 116 may also be placed on DVDs and other video media that can be viewed on alternative interactive Internet connectivity devices.

Users may optionally download, directly from a Website, Source URL lists (Table 3), icons 404–408 or toolbars 410 that are linked to Source Webpages in the Source Webpage Database 116, and embed them within or otherwise associate them with the users' own digital content. For example, users may place a toolbar in proximity to their own photo album, or place icons in their own video, or hyperlink text and images from content on their own corporate Intranets to Source Webpages in the Source Webpage Database 116.

While exemplary embodiments of the present invention have been shown in the drawings and described above, it will be apparent to one skilled in the art that various embodiments of the present invention are possible. For example, the specific configuration of the system as shown in FIG. 1, as well as the particular sequences of steps described with respect to each of the flowcharts, should not be construed as limited to the specific embodiments described herein. Modification may be made to these and other specific elements of the invention without departing from its spirit and scope as expressed in the following claims.

What is claimed is:

1. A system for purchasing a gift comprising the steps of:
creating a plurality of databases, each of which contains a list of gift of content elements organized according to a source coordinate and a destination coordinate, wherein the source coordinate is indicative of a location associated with the gift and the destination coordinate is indicative of a shipping locality of a recipient of the gift; and
receiving, via an Internet transmission, a request from a user of the system to initiate a shopping session for purchasing the gift including the steps of:
determining a coordinate pair consisting of said source coordinate and said destination coordinate in accordance with the request to initiate the shopping session;
locating a category of said content elements in one of said databases, using said coordinate pair, in accordance with a category selection request from the user; sending the user a gift list of said content elements located in said category; and receiving a request from the user to purchase said gift represented by one of said content elements in the gift list; and
sending a vendor a order for said gift in response to the request from the user to purchase said gift.

2. The system of claim 1, wherein the source coordinate represents said location selected from the group consisting of a country, a city, and a region associated with the content elements.

3. The system of claim 1, wherein the source coordinate is a default source coordinate representing the physical location of the user at a point of purchase of the user.

4. The system of claim 1, further including the steps of:
creating a user profile database including a personal profile containing preferences and attributes of the user;
determining a set of potential said gifts by filtering said category of said content elements in accordance with said user profile.

5. The system of claim 4, further including the step of creating a recipient profile, in the user profile database, including preferences and attributes of the recipient that are used in determining a filtered set of potential said gifts.

6. The system of claim 4, further including the step of creating a group profile, in the user profile database, including preferences and attributes, of a group of which the recipient is a member, that are used in determining a filtered set of potential said gifts.

7. The system of claim 1, wherein the request from a user of the system to initiate the shopping session is initiated via hyperlink associated with Internet-accessible content external to the system.

8. The system of claim 1, wherein the request from a user of the system to initiate a shopping session is initiated via a hyperlink associated with system-external Internet accessible advertising.

9. The system of claim 1, wherein the vendor is an importer of said gift.

10. The system of claim 1, wherein the vendor is a manufacturer of said gift.

11. The system of claim 1, further including the step of creating a source webpage database including a plurality of source web pages;
wherein each of the source web pages contains information relating to a corresponding said source coordinate;
wherein one of said web pages is transmitted to the user in response to the user selecting content on a content web page external to the system; and
wherein content in the content web page has an associated hyperlink to one of said source web pages.

12. The system of claim 11, wherein said content is selected from the group consisting of text, an image, an icon, and a toolbar.

13. The system of claim 1, wherein said shopping session is initiated via an electronic assistant.

14. The system of claim 13, wherein said electronic assistant provides instant messaging to determine the source coordinate and the destination coordinate and to further conduct the shopping session.

15. The system of claim 13, wherein said electronic assistant uses a voice portal to provide speech recognition to determine the source coordinate and the destination coordinate and to further conduct the shopping session.

16. The system of claim 1, wherein the category of said content elements is pie-determined in accordance with a type of device employed by the user to generate said request to initiate the shopping session.

17. The system of claim 1, wherein the category of said content elements is pre-determined in accordance with a source of said request to initiate the shopping session.

18. The system of claim 1, wherein said request is filtered in accordance with non-locational attributes in said category of said content elements.

19. The system of claim 1, wherein:
the user is prompted to initiate said shopping session via selection of a member of a display group selected from the group consisting of text an image, an icon, and a toolbar, wherein the member of the display group has an associated hyperlink to one said plurality of databases.

20. The system of claim 19, wherein at least one said member of the display group has an associated hyperlink to a source web page in a source webpage database including a plurality of source web pages, wherein each of the source web pages contains information relating to a corresponding said source coordinate.

21. The system of claim 20, wherein the member of the display group is associated with a digital photo album.

22. A system for sending a souvenir comprising the steps of:
creating a plurality of databases, each of which includes a list of souvenir content elements organized according to a source coordinate and a destination coordinate, wherein the source coordinate is indicative of a location associated with the souvenir and the destination coordinate is indicative of a shipping locality of a recipient of the souvenir;

receiving, via an Internet transmission, a request from a user of the system to initiate a session in which the souvenir is to be purchased;

determining a coordinate pair consisting of said source coordinate and said destination coordinate in accordance with the request to initiate the session;

locating a selected type of the souvenir in one of said databases, using said coordinate pair, in accordance with a souvenir type selection request from the user; and sending a vendor an order for the souvenir.

23. The system of claim 22, including the additional steps of:

composing a composed souvenir by locating a selected type of the souvenir and associated selected multimedia elements in one of said databases, using said coordinate pair, in accordance with a souvenir type selection request and a multimedia element selection request, respectively, from the user; and sending a vendor an order for the composed souvenir.

24. The system of claim 22, wherein the vendor is an importer of said souvenir.

25. The system of claim 22, wherein the vendor is a manufacturer of said souvenir.

* * * * *